March 23, 1954
R. O. DAVIS
2,672,669
CONTROL SYSTEM FOR CONCRETE BLOCK MACHINES
Filed Dec. 2, 1949
2 Sheets-Sheet 2
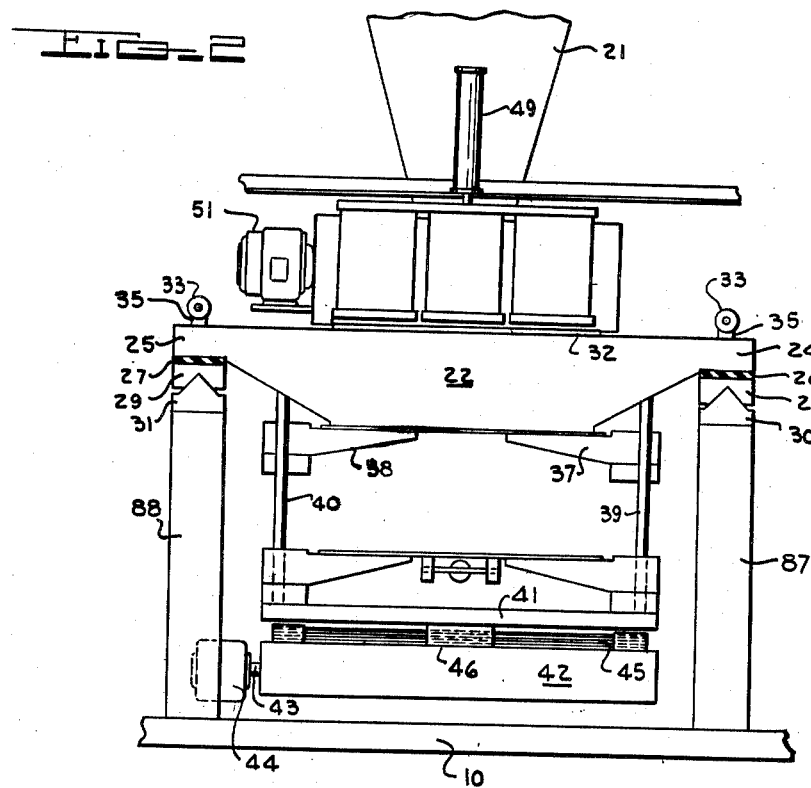
Inventor
ROBERT O. DAVIS
By Arthur M. Smith
Attorney Patented Mar. 23, 1954

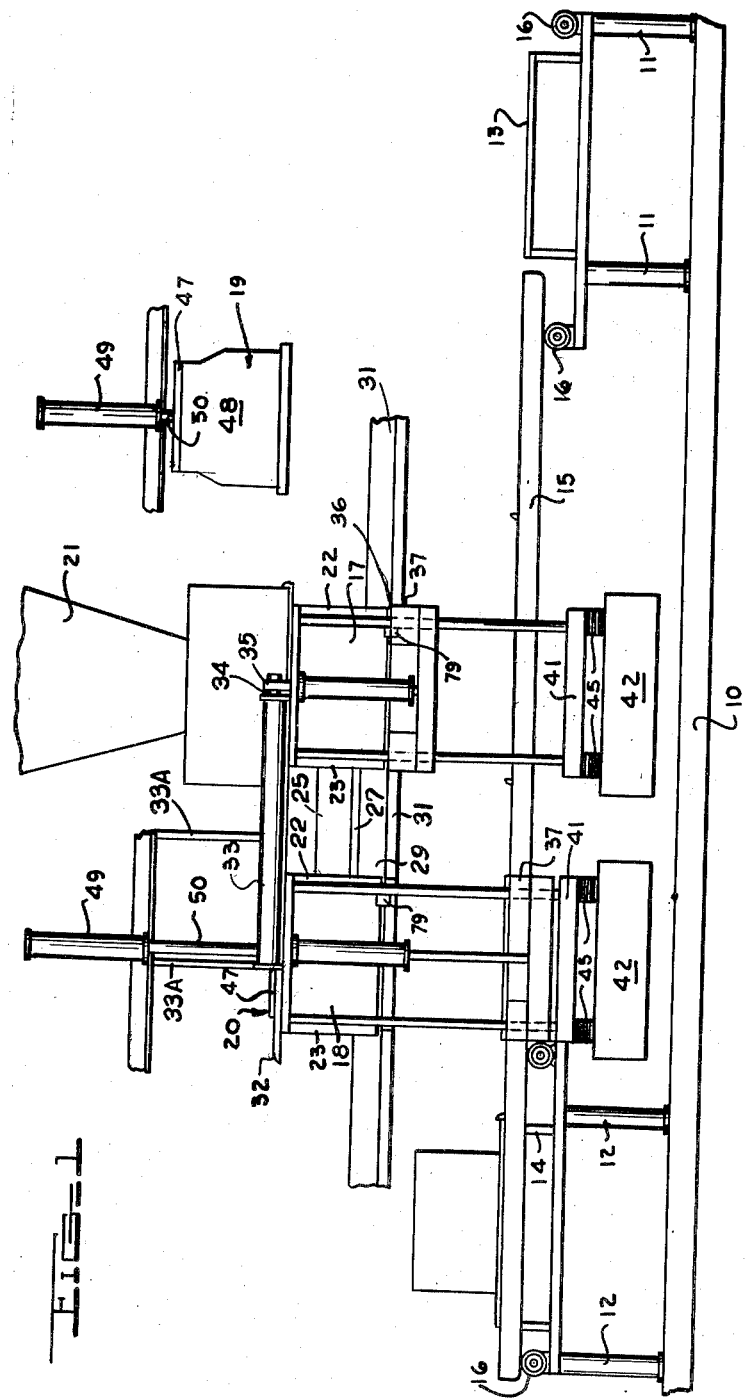

2,672,669

UNITED STATES PATENT OFFICE 2,672,669

CONTROL SYSTEM FOR CONCRETE BLOCK MACHINES

Robert O. Davis, Adrian, Mich., assignor to The Gene Olsen Corporation, Adrian, Mich., a corporation of Michigan Application December 2, 1949, Serial No. 130,787

13 Claims. (Cl. 25—41)

The present invention relates to a molding machine for molding plastic materials such as concrete products and more particularly to a machine in which one or more molds are moved through a timed machine cycle in which a mold is filled with a constant quantity of moldable material; the filled mold is moved to a finishing station where the concrete mix is molded into final form for removing from the mold; and the molded, but uncured mix, is thereafter removed from the mold and the machine cycle is repeated.

Previously, in molding plastic materials such as concrete products, the molds were filled with a constant volume of moldable material and the material thereafter compacted to a predetermined size. In practice, the consistency of the moldable material which is supplied from the hopper to the mold fluctuates considerably, depending largely upon the formulation of the materials therein, the degree of homogenization thereof, and also to some extent upon the prevailing atmospheric conditions. Under such conditions, the density of the finished molded products also fluctuates considerably.

The strength of the molded products, such as concrete blocks, is largely dependent upon the density and the uniformity throughout the blocks. It is, accordingly, of prime importance to provide a constant mass of molded material in each successive mold, regardless of the fluctuations in the density or consistency of the moldable material supplied to the molds.

In molding machines employing a plurality of molds which move through a timed cycle, it is of the utmost importance to maintain a constant compaction period for the material in each successive mold. In machines using two molds, one mold is filled with concrete while the concrete is compacted in the second mold. The compaction period is a direct function of the quantity of material within the mold. Accordingly, an increase in the compaction period, due to excessive filling of one mold, also increases the filling period for the second mold, which increase requires a still greater compaction period for the next succeeding mold. Under these conditions the machine will eventually stop. Conversely, should one mold require an insufficient time period during compaction of the material therein, the second mold will be positioned under the concrete feed hopper a shorter period of time. With less material filling the mold, the compaction of the material will be completed in a shorter period and continuously less quantities of material will enter each successive mold. It is accordingly necessary to maintain a constant compaction period for each successive mold in order to stabilize and to maintain a constant rate of production for the machine.

In contrast to the above prior molding machines, the present invention regulates the volume of moldable material filling each mold in accordance with variations in the density or consistency of the materials filling the previous mold. According to the present invention, variations in the work required to compact the material in one mold is employed to effect corresponding variations in the volume of material filling the mold during the next succeeding cycle.

Most satisfactory molding machines in use at the present time employ vibration to effect both the filling of the mold and also the compaction of the material therein. Normally, the amount of filling and the amount of compaction of the mold is controlled by manually varying the respective periods of vibration. As is apparent, the filling and compaction might also be varied by varying the amplitude of vibration. While the present invention is not limited to this type of control, the variable period control system is well adapted for use with this apparatus and will accordingly be described in connection therewith.

Preferably, the mold is provided with a vibrator connected directly thereto and vibrates during the filling operation for a period of time. The mold then moves to a compaction mechanism and is vibrated further until the material within the mold is compacted to a definite predetermined height. In addition to the vibrator, the compaction mechanism normally includes a finishing head which acts as a retaining member for the material therein. Some pressure is exerted by the head on the material, but it is not relied upon to complete the compaction of the mix. This is accomplished chiefly by the vibration of the mold box while the mix is held against movement therein by the finishing head. With substantially constant vibration, it is apparent that the time period for effecting compaction of the moldable material to a definite size and shape is a function of the density of the material being compacted.

In accordance with the present invention, a control system regulates the period of vibration during the filling operation to maintain a constant period of vibration during the compaction operation. The latter period is manually set to provide the most suitable material density. When the desired amount of material fills the mold, as indicated by coordination between the time filling and the actual time required to compact the material to the predetermined height, the control system is automatically inactivated. However, should the material filling the mold vary in density, the control system automatically operates to correct the volume of mix filling the mold during the next successive cycle to maintain a constant mass of material and thus maintain a constant block density.

A suitable control system for use in accordance with the present invention may comprise two oppositely acting control circuits for each mold, one being adapted to increase the filling period and the other circuit being adapted to decrease the filling period of the mold. The first circuit is preferably controlled by a conventional manually set electronic time delay mechanism. The latter mechanism is initially energized or otherwise started at some time in the cycle prior to the completion of the compaction operation, normally at the beginning thereof, and is set to increase the filling period following a predetermined time interval.

A second circuit is provided which is adapted to operate in the event that the material within the mold is compressed within the time period allowed by the first circuit. The second circuit is preferably provided with a manual or mechanical switch suitably operated by the compaction mechanism which includes the finishing head.

In the beginning of a cycle of the machine, a mold box is positioned under a moldable material hopper and the mold is vibrated for a period determined by the setting of an electronic time delay unit. The filled mold is then moved to the compaction mechanism wherein a finishing head closes the top of the mold and exerts a limited pressure on the upper surface of the material therein. The mold is then vibrated and a second electronic time delay unit is energized. Should compaction of the material within the mold require either a longer time period or a shorter time period, determined by the manually set electronic time delay unit, a signal will be transmitted through the control circuit to adjust the setting on the first electronic delay unit which will tend to correct the filling time in the proper direction.

Should either of the above circuits operate, the opposite acting circuit will be automatically inactivated. However, in order to prevent oscillations set up by the oppositely acting circuits, means are provided to inactivate each of the circuits when the density of the material within the mold falls within the desired limits.

In machines employing two or more molds, it is usually desirable to provide a separate control system for each mold, preferably set to maintain a similar and constant compaction period. By virtue of these control systems, the compaction periods are maintained constant and the molding machine is stabilized, whereby the rate of production of the machine is maintained constant.

It is therefore, an important object of the present invention to provide a molding machine for plastic materials such as concrete products which is adapted to continuously permit the manufacture of molded products within predetermined limits of constant size and of constant density.

It is a further object of the present invention to provide a control system for a molding machine which will regulate the mass of material entering the molds and will compensate automatically for variations in the consistency or physical characteristics of the material.

Another object of the invention is to provide a control system adapted for use with multi-mold machines in which the compaction periods for each of the molds may be maintained constant to stabilize the machine and to maintain a constant rate of production.

Another object of the invention is to provide a control system for a molding machine provided with oppositely acting circuits adapted to regulate a time control unit for controlling the mold feed period of the machine to maintain a constant period for compaction of the material in the mold and having a provision for regulating the system to provide a variable range of suitable densities for the molded material wherein each of the circuits is inactivated.

Another object of the invention is to provide a control system in which unit corrections are made in the feed time period in order that a substantial variation in one mold is not directly reflected in the filling period of the mold during the next successive cycle.

Another object of the present invention is to provide an electrical control circuit for a concrete molding machine in which one or more molds are moved through a timed machine cycle and in which the mold is filled with moldable material and the material compacted to a predetermined height by vibration, the control system being adapted to regulate the mold filling vibration period to maintain a constant compaction vibration period for the material within each of the molds.

Other objects of this invention will appear in the following description and appended claims, reference being had to the accompanying drawings forming a part of this specification wherein like reference characters designate corresponding parts in the several views.

In the drawings:

Fig. 1 is a front elevation showing a mold machine with certain of the structural parts partially shown suitable for use with the control system of the present invention.

Fig. 2 is an end elevation of the machine shown in Fig. 1 with certain of the structural parts being partially shown.

Fig. 3 is a schematic view of a control system embodying the features of the present invention.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

A molding machine which is adapted for use with the control system of the present invention is shown in the accompanying drawings as applied to the manufacture of concrete products and comprises a plurality of inter-related machine elements, power actuated mechanism actuated in timed relation to such machine elements to provide a work cycle which includes filling the mold with a concrete mix, moving the filled mold to a compacting station where compaction of the material in the mold is completed and then removing the compacted mix for the next cycle. The vibration of the mold boxes is utilized at all times during the mold filling operation and during the final compaction of the materials therein and is controlled by a control system to be described in detail below. This control system maintains a constant vibration period during the final compaction of the material in the mold by suitably varying the vibration period during the mold filling operation.

While the machine shown in the drawings is particularly adapted for the manufacture of concrete blocks, it is to be understood that a machine having a control system embodying the principles of the present invention may be readily adapted for the production of other forms of molded concrete products by providing mold boxes suited to the production of such other products and by adjusting the timing and the magnitude of movements of the machine elements to suit such changed requirements.

Referring to the drawings and particularly to Fig. 1, the numeral 10 designates a base on each end of which is mounted track supports 11 and 12, which support the turntables 13 and 14 respectively, which provide a rotatable connection between the tracks of the reciprocating table 15 and unloading tracks (not shown). Each of the supports 11 and 12 is provided with a plurality of anti-friction load carrying rollers 16 which support the end of the reciprocating table 15 at all times during its movement.

The machine shown in the drawing utilizes two mold boxes 17 and 18 and two finishing heads 19 and 20. It is to be understood however, that any number of mold boxes and finishing heads may be employed if desired.

As viewed in Fig. 1, the finishing heads 19 and 20 are located on opposite sides of the feed supply hopper 21.

The mold boxes 17 and 18 are each mounted on cross heads 22 and 23 which may also form two sides of the mold boxes. The mold boxes 17 and 18 are closed at their ends, but are open both at the top and bottom.

As shown in Fig. 2, the cross heads 22 and 23 are each provided with end portions 24 and 25 which are mounted on pads 26 and 27 of resilient, vibration absorbing material through which the cross heads 22 and 23 are connected with the movable inverted V-shaped movable ways 28 and 29 which are supported for sliding movement on fixed ways 30 and 31 which are mounted respectively on a plurality of supporting posts 87 and 88 fixed to the base 10.

The fixed ways 30 and 31 provide an elevated track which extends longitudinally of both the front and back portions of the base 10 and which is supported in vertically spaced relation thereto. The movable ways 28 and 29 and the cross heads 22 and 23 provide a movable carriage which travels as a unit upon the fixed ways 30 and 31, in reciprocating movement which carries the mold boxes 17 and 18 from the filling position below the hopper 21 to the finishing station below the finishing heads 19 and 20. The mold boxes 17 and 18 are resiliently attached at their adjacent top edges to a gate 32 which slides directly under the open bottom of the feed hopper 21. Any suitable type of resilient attachment may be used which will connect the mold boxes 17 and 18 and the gate 32 for movement as a unit and which will insulate the gate against vibrations transmitted from the mold boxes. The gate 32 may be provided with an extending portion of such a size that it will cut off the flow of material through the open bottom of the feed hopper 21 except when an empty mold is in its filling position directly below the open bottom thereof.

The mold boxes 17 and 18 and the gate 32 are reciprocated relative to the feed hopper by a plurality of synchronized power actuated cylinders 33 which are suitably mounted above and parallel to the fixed ways 30 and 31 and are connected as by the brackets 33a, Fig. 1, with the fixed portion of the frame of the machine. Each of the cylinders 33 has a piston (not shown) and a connecting rod whose end 34 is connected by a suitable connector 35 with the movable ways 28 and 29.

Actuation of the cylinders 33 to effect movement of the piston and the connecting rod is accomplished by any desired type of pressure fluid and is controlled by any conventional type pressure fluid cam actuated control valve. Such controls and valves are conventional and are therefore omitted from the present drawings and disclosure.

The open end of each of the mold boxes 17 and 18 is closed during the filling and finishing operation by a removable pallet 36 which is supported on pairs of vertical movable pallet support arms 37 and 38 which are mounted for vertical sliding movement on the pairs 39 and 40 of a parallel space depending guide rod.

The mold boxes 17 and 18 are subjected to high frequency vibrations during the filling of the mold box and during the finish molding of the concrete mix therein. The vibrations utilized are generated by any suitable type of power driven vibrator which preferably is connected with the bottom plate 41. The power driven vibrator shown in the drawings is one preferred type and comprises a vibrator housing 42 in which a rapidly rotating unbalanced shaft 43 is mounted. The rapidly rotating unbalanced shaft 43 is power driven by any suitable means, such for example as a high speed electric motor 44. The vibrations thus developed are high frequencies but of relatively low magnitude. The vibrator housing 42 is therefore suspended from the end 45 of a plurality of leaf springs. Each of the said leaf springs is connected midway of its ends with a saddle 46 which is secured to the bottom plate 41.

Thus upon operation of the motor 44, the unbalanced shaft 43 is rapidly rotated and sets up the primary vibrations of high frequency but of low magnitude in the vibrator housing 42. The magnitude is increased by the leaf type springs and the resultant vibration forces are transmitted to the bottom plate and through the slide rods to the mold boxes 17 and 18. Since the cross heads 22 and 23 are mounted on the pads 26 and 27 of the resilient vibration absorbing material, it will be seen that the vibration is localized in the mold boxes and the movable mold box carriage assembly.

By controlling the actuation of the motor 44 during the filling operation through the control system to be described subsequently, the actuation of the vibrator is timed so that the mold boxes are vibrated for a sufficient period to allow a constant mass of material to enter the mold to maintain the period of vibration during the compression operation at a constant. The motor 44 is controlled during the compaction period by any suitable mechanical switches (not shown) to compact the material to a definite predetermined height. In the modification shown in the drawing, vibration may be utilized during the movement of the filled mold box to the finishing station and during the finishing operation. The vibration is preferably discontinued as soon as the molding of the material in the mold box is completed, when the concrete block has been compacted to the predetermined height dimension. This tends to prevent crumbling of the molded but uncured material as it leaves the mold.

Each of the finishing heads 19 and 20 comprises a solid top plate 47 to which is secured a plurality of spaced depending plungers 48 which are of suitable size, shape and placement to fit into the open portion of the mold box 17 and surround the core portions normally employed therein.

The finishing heads 19 and 20 act as retaining members when moved into the mold boxes 17 and 18 and hold the concrete mix therein during the finishing of the molding operation. Some pressure is exerted by the heads on the material in the mold boxes 17 and 18 but the pressure heads are not relied upon to complete the compaction of the mix. This is accomplished chiefly by the continued vibration of the mold boxes while the mix is held against movement by the finishing heads 19 and 20. The finishing heads 19 and 20 are movable vertically relative to the mold boxes 17 and 18 to such an extent that the plungers 48 are completely withdrawn from the mold boxes 17 and 18 after ejection of the finished molded material therefrom. This permits free sliding movement of the mold boxes 17 and 18 from the finishing station to the filling station and vice versa.

Each of the finishing heads 19 and 20 is actuated by a fluid pressure actuated cylinder 49 suitably mounted on the machine. The movable piston in the cylinder 49 is connected with one end of a connecting rod 50 whose other end is fixed to the top plate 47. Pressure fluid is supplied to the cylinder 49 through any suitable system of conventional control valves (not shown) which are actuated by any desired type of timing means (not shown) to effect actuation of the cylinder 49 to raise or lower the finishing heads 19 and 20 onto or out of the material in the mold boxes 17 and 18 and to exert limited pressures thereon as may be required to finish the molding of the mix and to unload the mix.

The feed hopper 21 may be provided with a plurality of agitators (not shown) located in the discharge throat thereof. The agitators may be driven by any suitable means, such for example as an electric motor 51, which is connected therewith through any suitable conventional drive gear mechanism (not shown). These agitators may be rotated during the filling of the molds 17 and 18 to prevent sticking or bridging of the concrete mix in the throat or mouth portion of the hopper 21 and thus insure a sufficient supply of material to the mold boxes during each filling operation.

The reciprocating table 15 and the turntables 13 and 14 may be actuated by any suitable means (not shown).

The electrical control system for the molding machine is shown in Fig. 3 of the drawings and comprises essentially two oppositely acting circuits which control the period of vibration during the filling operation of the mold 17 to maintain a substantially constant vibration period during compaction of a predetermined height block. Only one control system is illustrated although it is preferable to provide a separate system for each mold box.

The circuit may be best understood by following the flow of current therethrough under the conditions of (1) excessive filling of the mold during the filling operation and (2) insufficient filling of the mold during the filling operation.

At the beginning of the compaction operation the switch 60 is momentarily closed, such as in response to movement downwardly by one of the finishing heads 19 and 20. Current may then flow through the lead 61, the solenoid 62, the switch 60 back to the ground connection 63. The solenoid 62 then closes the contacts 64, 65 and 66. Although the switch 60 was only momentarily closed by one of the finishing heads 19 and 20, the solenoid is now held in closed position by current flowing through the lead 67, contact 65, switch 68 (dotted line position), and lead 69. Current flowing through the circuit including the leads 70, the electronic time delay relay 71, the wire 72, contacts 64 and the wires 69 and 63 energizes the electronic time delay relay 71. Current may then flow through the wire 73, the coil 74, and the wires 69 and 63 to move switch 68 to its dotted line position. Energizing the electronic time delay relay also begins the manually set time period for normal operation of the compaction of the material in one of the molds 17 and 18. The vibrator may be directly controlled by the electrontic time delay relay 71. It is preferable, however to provide a separate switch which will be actuated when the material has been compacted to a definite predetermined height, such as by the pressure head. Thus any variation in the blocks will be in the density of the block rather than in the physical dimensions thereof. However, it should be noted that under normal operation, the control system maintains a constant density as well as a constant period of compaction of the material in each successive mold.

In the event that an excessive amount of material entered the mold during the filling operation, the electronic time delay relay 71 opens the switch 68 after expiration of the preset time period which permits current to flow through the lead 75, the solenoid operated ratchet 76, the lead 77, a variable time delay relay 78, the normally closed limit switch 79 (shown also in Fig. 1), the switch 68 and the leads 69 and 63. This current effects a correction in the setting on a second electronic time delay unit 80, which unit regulates the period of vibration for the mold during the filling operation.

In the event that an insufficient amount of material was supplied to the mold during the filling operation, the finishing head is lowered prior to the closure of the switch 68 by the electronic time delay relay 71. The switch 79 is moved to its dotted line position, such as by contact with one of the finishing heads 19 and 20. A circuit is then complete which includes the lead 81, the solenoid ratchet 82, a second variable time delay relay 83, the contacts 66, the leads 84, switch 79, leads 85, 86 and 67, the contacts 65, switch 68, and the leads 69 and 63. This current regulates the setting on the electronic time delay unit 80 to increase the filling period for one of the molds 17 and 18.

At the completion of the preset time period, switch 68 is opened. The circuit through the solenoid 62 is thus opened, which accordingly opens the contacts 64, 65 and 66.

The variable time delay relay 78 and 83 are inserted in their respective circuits to provide a variable time period wherein neither of the correcting circuits will operate, thus continuous oscillation of the setting on the electronic time delay unit 80 is prevented.

In the modification shown in the drawing, the electronic time delay unit 71 is manually set to give the desired period for compression of the material within the mold and thus to give a block having the most desirable density. This time delay unit cooperates with the control system to regulate the electronic time delay unit 80 which controls the period of operation of the motor 43 for one of the mold boxes 17 and 18 during the filling operation. The switch 79 completes the circuit to the ratchet solenoid 82 at approximately the time that the block has been compressed to the desired height. The electronic time delay unit 71 controls the operation of the switch 68. When the points 64 and 65 are closed and the solenoid 71 is energized, the switch 68 is moved to close the circuit through the points 65 and the solenoid 62. The switch 68 remains in this position until the manually-set time period has elapsed, at which time switch 68 moves to the position shown in the drawings.

It may therefore be seen that when the correct quantity of material is provided in the mold during the filling operation, the correcting circuits are inactivated and no signal is transmitted to the electronic time delay relay which regulates the filling operation. For example, should the time period elapse and the finishing head engage the switch 79 simultaneously, or within the period allowed by the time delay relay 78 and 83, the switch 79 opens the positive feed circuit and the switch 68 opens the negative feed circuit. Thus no current flows through either circuit and no correction is made in the setting on the electronic time delay relay 80.

The electronic time delay relays are of conventional design and are accordingly not described herein in detail. Also, any suitable time delay relays may be employed without departing from the principles of this invention. In fact, if desired, additional electronic time delay relays may be substituted for the time delay relays or may be used in connection therewith to provide a more sensitive control.

Moreover, the ratchet feed mechanisms 76 and 82 are shown schematically in the drawing since any suitable and conventional mechanism may be employed to effect corrections in the setting of the electronic delay in response to variations in the compaction period of the material in the mold. Preferably, the ratchet mechanisms are adapted to effect unit changes in the setting of the electronic time delay relay 80 as shown in the drawings. However, it is apparent that, if desired, a plurality of unit changes may be made in accordance with the magnitude of variation in the compaction period.

In the operation of the block machine of the present invention, the quantity of material filling the molds is dependent upon the time of vibration of the mold boxes. In any setting of the machine or with material of any operative consistency, the mold box will be completely filled during the filling period. However, if the mold box is vibrated during filling for a relatively long period of time, the material filling the mold box will be densified to a relatively great extent and will permit the entry of additional quantities of material into the mold from the feed hopper. If the material coming from the hopper is relatively dense, the material will not require appreciable densification in order to fill the mold box with the desired mass of material and, in this case, the vibrator will only operate over a relatively short period of time.

The general operation of the machine may be best understood by following one of the mold boxes through a complete cycle. In the beginning of the cycle, for example, the mold box is positioned below the material feed hopper 21. The mold box is then automatically vibrated for a period of time, determined by the control system discussed in detail above. The mold box is then moved to a position under the pressure head 46, the other mold being simultaneously moved under the feed hopper.

The pressure head then lowers automatically into contact with the upper surface of the moldable material in the first mold and the mold is again vibrated. Preferably, the mold is started to vibrate immediately after leaving the hopper. The control system then measures the work required to compact the material in the filled mold box to a predetermined height or to a desired density. In the illustrated embodiment of the invention, the time period necessary to compact the material to the desired height, after the finishing head is lowered, is measured. This measurement is used in controlling or adjusting the means which controls the period of vibration of the mold box when it is positioned under the feed hopper during its next cycle.

When the material in the mold has been compacted to the desired extent, the mold vibration is automatically inactivated and the pressure head moves down through the mold box to eject the finished block from the mold. The block and the pallet are lowered onto the reciprocating table and removed from the machine.

It should be apparent that the present invention provides a molding machine for plastic materials, such as concrete products which is adapted to continuously permit the manufacture of molded products of constant size and of constant density. The filled mold is vibrated during the compaction operation until the material therein has been compacted to a predetermined height. Using a normal material, the compaction operation is accomplished during a definite time interval to give a concrete product of the desired density. If the compaction operation should require a greater period or a lesser period, the control system automatically operates to vary the volume of material entering the mold during the filling operation to maintain a constant compaction period. Thus, the material in the mold is always compacted to a predetermined height, the density of the finished molded product is maintained constant and the compaction period for each successive mold is also maintained constant.

The control system maintains a constant mass of material entering the mold by regulating the volume in accordance with variations in the consistency thereof. The same mass of material will always be compacted in a substantially constant period of time. By maintaining a constant compaction period, the mass of material entering the mold is also maintained at a constant.

In addition to insuring successive uniform and high quality block production by a molding machine, the control system of the present invention also maintains a constant period of compaction for each successive block in order to stabilize multi-mold machines and to maintain a constant rate of production for these machines.

While I have here shown and described a control system in connection with a two mold machine, it should be understood that the invention may also be applied to molding machines using any suitable number of molds, having a separate control system for each mold.

Having thus described my invention, I claim:

1. A control system for a molding machine in which a mold is filled with moldable material and the material thereafter compacted to provide a finished block having a uniform density and height dimension and in which the filling and compaction are both accomplished by vibration of the material, comprising an electrical circuit, including a timing means, the starting of said timing means being in timed relation with the start of the compacting operation of the machine and said timing means being adapted to operate after a predetermined time of vibration to effect a decrease in the time period of vibration for filling the next succeeding mold, and a second electrical circuit adapted to operate upon compaction of the material in the mold to a definite height, to effect an increase in the time period for filling the next succeeding mold, operation of one of said circuits automatically inactivating said other circuit.

2. A control system for a molding machine in which a mold is filled with moldable material and the material thereafter compacted to a predetermined height dimension and in which the filling and compaction are both accomplished by vibration of the material, comprising an electrical circuit, including a timing means, the starting of said timing means being in timed relation with the start of the compacting operation of the machine and said timing means being adapted to operate after a predetermined time of vibration to effect a decrease in the time period of vibration for filling the next succeeding mold, and a second electrical circuit adapted to operate upon compaction of the material in the mold to a definite height, to effect an increase in the time period for filling the next succeeding mold, operation of one of said circuits automatically inactivating said other circuit.

3. A control system in accordance with claim 2 and further characterized wherein each of said circuits is provided with a time delay means to prevent oscillation in the filling period of the mold.

4. A control system for a molding machine in which a mold is filled with moldable material and the material thereafter compacted to a predetermined height dimension and in which the filling and compaction are both accomplished by vibration of the material, comprising a negative feed circuit including a preset timing means adapted to be set to the desired time of vibration for compaction of the material in the mold, a positive-feed circuit including an adjustable timing means for controlling the period of vibration for filling of the mold, said preset timing means being adapted to regulate said adjustable timing means upon expiration of said preset time interval to regulate said adjustable timing means to decrease the vibration period for filling the mold, said negative-feed circuit being adapted to operate upon compaction of the material in the mold to a predetermined height and adapted to regulate said adjustable timing means to increase the vibration period for filling the mold, and means to inactivate one circuit upon operation of said other circuit.

5. A control system in accordance with claim 4 and further characterized wherein each of said circuits is provided with a variable time delay means to prevent oscillation of the setting on said adjustable timing means.

6. A control system in accordance with claim 4 and further characterized in that each of said circuits is provided with a means to effect a unit adjustment in said adjustable timing means upon operation thereof.

7. A control system for a molding machine in which a mold is filled with moldable material and the material thereafter compacted for a predetermined interval of time and in which the filling and compaction are both accomplished by vibration of the material, comprising a negative-feed circuit including preset electronic time delay unit for controlling the period of vibration for compacting the material in the mold, a positive-feed circuit including an adjustable electronic time delay unit for controlling the period of vibration for filling the mold, said preset electronic unit being adapted to regulate said adjustable electronic unit upon the expiration of said preset time period to decrease the vibration period for filling the mold, said negative-feed circuit being adapted to operate upon compaction of the material in the mold to a predetermined height and adapted to regulate said adjustable timing means to increase the vibration period for filling the mold, each of said circuits having a means to open the other circuit upon operation thereof.

8. In a molding machine in which a plurality of molds are moved through a timed cycle and in which one of the molds is filled with moldable material while the material in a second mold is compacted, the machine having an adjustable means adapted to fill the molds and a compaction means adapted to compact the material therein to provide a finished block having a uniform density and height dimension, a control system for each of the molds adapted to maintain a constant compaction period therefor whereby the operation of the machine is stabilized comprising means for measuring the work required to compact the material in the mold to the finished block and means for regulating the adjustable means in response to variations in the work required to compact the material.

9. In a molding machine in which a plurality of molds are moved through a timed cycle and in which one of the molds is filled with moldable material while the material in a second mold is compacted, the machine having an adjustable means adapted to fill the molds and a compaction means adapted to compact the material therein to a predetermined height dimension, a control system for each of the molds adapted to maintain a constant compaction period therefor whereby the operation of the machine is stabilized comprising means for measuring the work required to compact the material in the mold to the predetermined height dimension and means for regulating the adjustable means in response to variations in the work required to compact the material.

10. In a molding machine in which a plurality of molds are moved through a timed cycle and in which one of the molds is filled with moldable material while the material in a second mold is compacted to a predetermined height and in which the filling and compaction are both accomplished by vibration of the material, a control system for each of the molds and adapted to maintain a constant compaction period whereby the operation of the machine is stabilized comprising an electrical circuit, including a timing means, the starting of said timing means being in timed relation with the start of the compaction operation of the machine and said timing means being adapted to operate after a predetermined time of vibration to effect a decrease in the time of vibration for filling the mold during the next succeeding cycle, and a second electrical circuit adapted to operate upon compaction of the material in the mold to a predetermined height to effect an increase in the time period for filling the mold during the next succeeding cycle, operation of one of said circuits automatically inactivating said other circuit.

11. In combination, a mold, means to feed material to the mold, means to compact said material within the mold, automatic means to operate said compaction and feed means, means to control the operation of the feed means and the compaction means, said control means comprising a time cycle control element, means to initiate operation of the time cycle control element simultaneously with the operation of the compaction means, means connected with the time cycle control element to control the time of operation of the feed means, and means controlled by the stopping of the compaction means and connected to the time cycle element to cause the time cycle element to control the operation of the control for the feed means.

12. In combination, a mold, means to feed material to the mold, means to compact said material within the mold, automatic means to operate said compaction and feed means, means to control the operation of the feed means and the compaction means, said control means comprising a time cycle control element, means to initiate operation of the time cycle control element simultaneously with the operation of the compaction means, means connected with the time cycle control element to control the time of operation of the feed means, means controlled by the stopping of the compaction means and connected to the time cycle element to cause the time cycle element to control the operation of the control for the feed means, and said controls so arranged that any increase in the time of operation of the compaction means results in a corresponding decrease of time of operation of the next succeeding operation of the feed means and vice versa.

13. A mold, means for feeding material to the mold, means to compact the material in the mold, means to control said compaction means, means to control the operation of said feed means, said last named means comprising a time cycle element, means to operate said element, means connected to said last named means to vary the duration of the operation of the feed means, said last named means comprising a timer element to initiate and stop the operation of the means to operate said element, and means connecting said means to operate said element and said compacting means to vary the operation of said element in accordance with the duration of the operation of the compacting means.

ROBERT O. DAVIS.

References Cited in the file of this patent
UNITED STATES PATENTS

| Number | Name | Date |
|---|---|---|
| 1,879,367 | Lotz | Sept. 27, 1932 |
| 2,256,798 | Yeakel | Sept. 23, 1941 |
| 2,275,676 | Gelbman et al. | Mar. 10, 1942 |
| 2,366,780 | Gelbman et al. | Jan. 9, 1945 |
| 2,484,506 | Hawk | Oct. 11, 1949 |